United States Patent [19]

Geniès

[11] Patent Number: 4,547,439
[45] Date of Patent: Oct. 15, 1985

[54] ELECTROCHEMICAL GENERATOR

[75] Inventor: Eugène Geniès, St. Egreve, France

[73] Assignee: Commissariat a l'Energie Atomique, Paris, France

[21] Appl. No.: 527,324

[22] Filed: Aug. 29, 1983

[30] Foreign Application Priority Data

Sep. 1, 1982 [FR] France .............................. 82 14941

[51] Int. Cl.⁴ .............................................. H01M 4/60
[52] U.S. Cl. .................................... 429/105; 429/198; 429/213
[58] Field of Search ............... 429/105, 213, 212, 194, 429/198

[56] References Cited

U.S. PATENT DOCUMENTS

| 3,185,590 | 5/1965 | Mayer et al. | 429/213 X |
| 4,181,779 | 1/1980 | Teo | 429/213 X |
| 4,442,187 | 4/1984 | MacDiarmid et al. | 429/213 |

FOREIGN PATENT DOCUMENTS 0036118 9/1981 European Pat. Off.
0058469 8/1982 European Pat. Off.

OTHER PUBLICATIONS

Journal of the Electrochem. Soc., vol. 129, No. 5, May, 1982, Manchester, New Hampshire, R. A. Bull et al.: "Polymer Films on Electrodes. VII. Electrochemical Behavior at Polypyrrole-Coated Platinum and Tantalum Electrodes", pp. 1009–1015.

IMB Journal Res. Develop., vol. 25, No. 1, Jan., 1981, A. Diaz et al.: "(Pt) Polypyrrole: A New Organic Electrode Material", pp. 42–50.

Primary Examiner—Anthony Skapars
Attorney, Agent, or Firm—Pearne, Gordon, Sessions, McCoy, Granger & Tilberry

[57] ABSTRACT

Electrochemical generator comprising an anode compartment and a cathode compartment, separated by a semipermeable diaphragm and each containing an active electrode material and an electrolyte, the active electrode material of at least one of the compartments being constituted by an electronically conductive organic polymer, wherein in one of these compartments in which the active electrode material is an organic polymer, the electrolyte of said compartment comprises an electroactive compound, which is soluble in the electrolyte and has a redox potential which is close to that of the organic polymer with which it is in contact.

17 Claims, 2 Drawing Figures

ELECTROCHEMICAL GENERATOR

BACKGROUND OF THE INVENTION

The present invention relates to an electrochemical generator, usable more particularly as a battery. More specifically, it relates to electrochemical generators, in which use is made of an organic polymer as the active electrode material in at least one of the anode or cathode compartments of the generator.

For some years, consideration has been given to the use as active electrode materials of organic materials formed either by polymers, which store the energy by a phenomenon of the "charge transfer complex type", or by doped polymers such as polyacetylene (cf A. Schneider, W. Greatbatch, R. Mead, "Performance characteristics of a long-life pacemaker cell" 9th International Power Sources Symb. 651–659 (1974) F. Bénière, "La percée des piles plastiques", La Recherche 12, 1132, 1981).

It is also possible to use polyparaphenylene, polythiophene, polypyrrole, polyaniline or other highly conjugated polymers as the electronic conductive organic polymer in generators of this type.

However, although such generators have satisfactory characteristics, they have the disadvantage of not being able to have a high capacity, which it is wished to obtain a rapid discharge of the battery. Thus, in order to have said rapid discharge, it is necessary to limit the thickness of the active electrode material, which does not make it possible to obtain a high capacity and limit the use of such generators as power batteries for starting motor vehicles.

BRIEF SUMMARY OF THE INVENTION

The present invention relates to an electrochemical generator, which obviates the aforementioned disadvantage.

This electrochemical generator comprises an anode compartment and a cathode compartment separated by a semipermeable diaphragm, each of which contains an active electrode material and an electrolyte. The active electrode material of at least one of these compartments is formed by an electronically conductive organic polymer. In one of these compartments, where the active electrode material is an organic polymer, the electrolyte of the said compartment comprises an electroactive compound, which is soluble in the electrolyte and has a redox potential which is close to that of the organic polymer forming the active material with which it is in contact.

As a result of the presence of this electroactive compound in contact with the active electrode material constituted by an organic polymer, the transfer of electrons into the latter is accelerated and at the same time there is an improvement to the diffusion into said polymer of opposed ions from the electrolyte.

According to the invention, the electroactive compound constitutes a reversible redox couple, whose redox potential is close to that of the polymer with which it is in contact. Generally, this potential is slightly different from the redox potential of the polymer, the variation between these two potentials possibly being up to 500 mV.

When the electronically conductive organic polymer in contact with the electroactive compound constitutes the positive electrode material, the electroactive compound present in the anode compartment is advantageously chosen from ferrocene and its derivatives, methoxylated derivatives of benzene, diphenyl-9-10-anthracene and its methoxylated derivatives, di-($\alpha$-naphthyl)-9,10-anthracene and its methoxylated derivatives, heterocyclic aromatic compounds and aromatic amines.

The derivatives of ferrocene are in accordance with the formula:

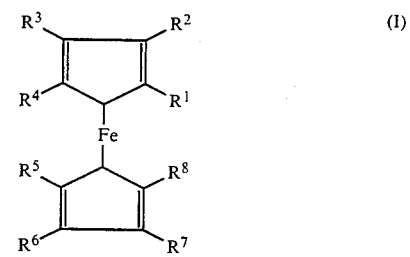

in which $R^1$, $R^2$, $R^3$, $R^4$, $R^5$, $R^6$, $R^7$ and $R^8$, which can then be the same or different, represent hydrogen $NO_2$, $SO_2$, $CN$, $OCH_3$, $Cl$, $F$, $SCN$, $OCN$,

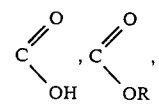

and

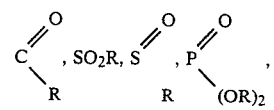

OR, SR and R with R representing an alkyl or aryl radical.

Advantageously, when the electronically conductive organic polymer is polypyrrole, the electroactive compound is ferrocene, i.e. the compound of formula (I) in which $R^1$, $R^2$, $R^3$, $R^4$, $R^5$, $R^6$, $R^7$ and $R^8$ represent hydrogen. When use is made of ferrocene derivatives in accordance with formula (I), the nature of the groups $R^1$ to $R^8$ is chosen in such a way as to adapt the redox potential of the ferrocene derivative to the polymer used as the positive electrode material.

The methoxylated derivatives of benzene which can be used are in accordance with formula:

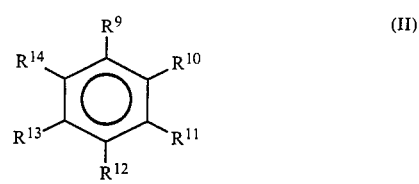

in which $R^9$, $R^{10}$, $R^{11}$, $R^{12}$, $R^{13}$, $R^{14}$ which can be the same or different, represent hydrogen, a methyl radical or a methoxy radical, provided that at least one of the $R^9$, $R^{10}$, $R^{11}$, $R^{12}$, $R^{13}$, $R^{14}$ represent the methoxy radical.

The heterocyclic aromatic compounds which can be used are in accordance with the formula:

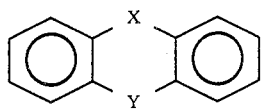
(III)

in which X and Y, which can be the same or different, represent NH, N-phenyl, N-alkyl, O or S. It is also possible to use methoxylate derivatives of these heterocyclic aromatic compounds. An example of such a compound is phenothiazine (compound of formula III with X=NH and Y=S).

The aromatic amines which can be used are triphenyl amines, benzidines, paraphenylene diamines and hydrazines.

The triphenylamines are in accordance with the formula:

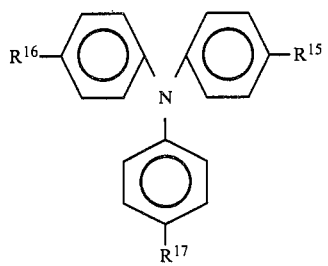
(IV)

in which $R^{15}$, $R^{16}$ and $R^{17}$, which can be the same or different, represent hydrogen, Cl, Br, F, $NO_2$, $OCH_3$, $SO_2$, CN, SCN, OCN, $$\overset{O}{\underset{R}{C\!\!\diagup}}, SO_2R, \overset{O}{\underset{R}{S\!\!\diagup}}, \overset{O}{\underset{OH}{C\!\!\diagup}}, \overset{O}{\underset{OR}{C\!\!\diagup}}, \overset{O}{\underset{(OR)_2}{P\!\!\diagup}},$$

OR, SR and R with R representing an alkyl or aryl radical.

The benzidines which can be used are in accordance with formula:

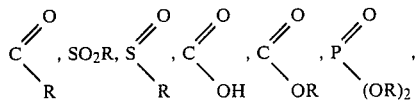
(V)

in which $R^{18}$, $R^{19}$, $R^{20}$, $R^{21}$ which can be the same or different, represent hydrogen, an alkyl radical or a phenyl radical.

The paraphenylene diamines which can be used are in accordance with the formula:

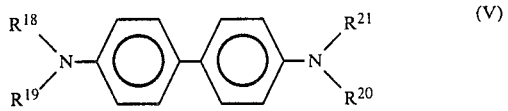
(VI)

in which $R^{22}$, $R^{23}$, $R^{24}$ and $R^{25}$, which can be the same or different, represents hydrogen, an alkyl radical or a phenyl radical.

For example, it is possible to use tetraphenyl paraphenylenediamine, i.e. the compound of formula VI with $R^{22}$, $R^{23}$, $R^{24}$ and $R^{25}=C_6H_5$.

The hydrazines which can be used are in accordance with the formula:

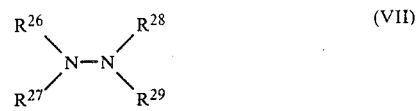
(VII)

in which $R^{26}$, $R^{27}$, $R^{28}$ and $R^{29}$, which can be the same or different, represent an alkyl or phenyl radical.

In the electroactive compounds according to the invention, the alkyl radicals which can be used are straight or branched alkyl groups in $C_1$ to $C_{10}$ such as methyl, ethyl, propyl, butyl, etc. The aryl radicals which can be used are phenyl, benzyl and similar radicals.

When the organic polymer in contact with the electroactive compound constitutes the negative electrode material, the following electroactive compounds can be used in the cathode compartment:

aromatic polycyclic hydrocarbons, such as naphthalene, anthracene, phenanthrene, pyrene, chrysene and rubene;

quinone derivatives, such as benzophenone, anthraquinone and benzoquinone, etc;

aromatic nitro derivatives, such as mononitrobenzene, dinitrobenzenes and trinitrobenzenes, which may or may not be substituted by alkyl groups, e.g. trinitromesitylene, dinitromesitylene, nitromesitylene, dinitrodurene and nitrodurene.

When the negative active material is formed by polymer and lithium at one and the same time, it seems that these additives can also play the role of glossing agent for the lithium deposit and prevent the formation of dendrites.

According to the invention, choice is also made of the electroactive compound as a function of its diffusion coefficient into the active organic polymer material in such a way as to obtain the fastest diffusion of the oxidized or reducing species into the polymer. When the organic polymer is polypyrrole, it has been found that ferrocene makes it possible to achieve a diffusion coefficient of approximately $10^{-8}$ cm$^2$/s and to consequently gain a factor of 50 compared with the system when ferrocene is absent and when the diffusion coefficient is approximately 2 to $5.10 \times 10^{-10}$ cm$^2$/s and, in the case where lithium perchlorate is used as the electrolyte.

According to the invention, the addition of a small amount of electroactive compound to the electrolyte is adequate to significantly improve the electrical characteristics of the electrochemical generator. When the electrolyte is in solution, the quantity of electroactive compound used is advantageously $10^{-3}$ to 1 mole/l of electrolyte.

According to the invention, when the active electrode materials present in each of the anode and cathode compartments are electronically conductive organic polymers, it is possible to add to each of the compartments an electroactive compound having the aforementioned characteristics, i.e. a redox potential close to that of the polymer with which it is in contact, provided that use is made of different electroactive compounds in each of the two compartments or an electroactive compound with two electroactive sites, such as ferrocene phenyl ketone.

In this case, the electrolyte of the anode compartment comprises an electroactive compound, which is soluble in the electrolyte and which has a redox potential close to that of the organic polymer of the anode compartment, whilst the electrolyte of the cathode compartment comprises an electroactive compound different from that of the anode compartment and which is soluble in the electrolyte, whilst having a redox potential which is close to that of the organic polymer present in the cathode compartment.

According to the invention, one of the active electrode materials is advantageously polypyrrole, i.e. a polymer of pyrrole or a pyrrole derivative, or a copolymer of pyrrole and/or pyrrole derivatives.

This polypyrrole is in accordance with the following formula:

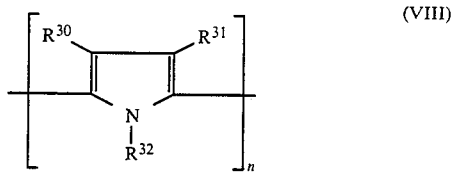 (VIII)

in which $R^{30}$, $R^{31}$ and $R^{32}$, which can be the same or different, represent a hydrogen atom, a group chosen from among $NO_2$, $SO_2$, $CN$, $OCH_3$, $Cl$ and $F$,

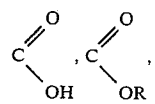

SCN, OCN,

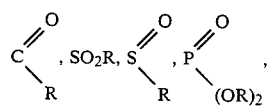

SR (with R=an alkyl or aryl radical) or a radical chosen from among the alkyl and aryl radicals optionally having one or several substituents chosen from the group including $NO_2$, $SO_2$, $CN$, $OCH_3$, $Cl$ and $F$, SCN, OCN,

$SO_2R$,

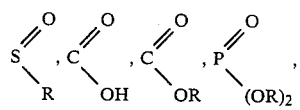

SR (with R=an alkyl or aryl radical) and n is a number higher than 5 and preferably between 5 and 200,000.

The alkyl radicals which can be used are straight or branched alkyl groups in $C_1$ to $C_{10}$, such as methyl, ethyl, propyl, butyl, etc. Aryl radicals which can be used, are phenyl, benzyl and similar radicals.

This polymer can be obtained by the polymerization of the pyrrole of formula:

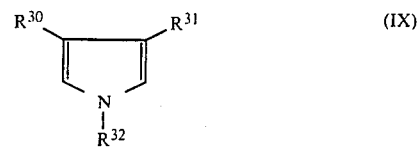 (IX)

in which $R^{30}$, $R^{31}$ and $R^{32}$ have the meanings given hereinbefore. This polymerization can either be carried out chemically or electrochemically.

In order to obtain polypyrrole chemically, use is made of oxidizing agents in order to polymerize the pyrrole of formula XI dissolved in an appropriate solvent. The polymer obtained is precipitated in the form of a powder, which can then be agglomerated, e.g. by fritting, to constitute the active material of the electrode. The oxidizing agents used are agents, whose redox potential is close to that of pyrrole (0.7 Vs Ag$^-$/Ag$^+$).

Examples of such oxidizing agents are ferric perchlorate, ferric sulphate, double ammonium and cerium nitrate, ammonium persulphate and cation salts or organic cation radicals, e.g. 10-methyl phenothiazine perchlorate.

Widely differing solvents can be used. Thus, it is possible to use water, aqueous solutions of acid such as sulphuric and perchloric acids, and organic solvents such as acetonitrile, methanol and dichloromethane.

In order to obtain polypyrrole electrochemically, this is deposited on an electrode from an electrolytic solution containing pyrrole of formula (IX), or an oligomer formed from the latter, a support electrolyte and a solvent, by passing an electrical current between the electrode and a counter-electrode, which is also immersed in the electrolytic solution.

In this case, polymerization takes place by oxidation of the monomer on the electrode and it is possible to check the electrical conductivity, adhesion and morphology properties of the polymers deposited, by appropriately choosing the solvent, the support electrolyte and the electrode material, whilst also regulating the current density.

Support electrolytes which can be used are salts such as lithium perchlorate $LiClO_4$, sodium hexafluorophosphate $NaPF_6$, tetraethylammonium borofluoride $N(C_2H_5)_4BF_4$ and tetraethylammonium chloride $N(C_2H_5)_4Cl$.

The solvents can also vary widely and it is possible e.g. to use acetonitrile, propylene carbonate, methanol and water.

This electrochemical method of preparing the polypyrrole has the advantage of directly leading to the obtaining of a polypyrrole layer deposited on an electrode, which can constitute the current collector of the electrochemical generator, which combines the advantage of simple, inexpensive synthesis, with the obtaining of a good cohesion between the polypyrrole and the current collector.

Moreover, in this case, polypyrrole doped by the anion of the salt used as the support electrolyte is directly obtained. Therefore, when use is made of this polypyrrole as the active positive electrode material, it is not necessary to charge the generator at once.

In the electrochemical generator according to the invention, the active electrode material formed by the electronically conductive organic polymer is intimately combined with a current collector generally constituted by a plate or grid. In materials which can be used for forming the current collector are metals, e.g. nickel or stainless steel in the form of plates or grids, graphite in the form of a fabric or plate and organic conductive materials such as polyacetylene $(CH)_x$.

The other active electrode material can be formed by a reactive metal such as lithium, as well as by an electronically conductive organic polymer, which can be the same or different to the polymer forming the first active electrode material. It is also possible to use other compounds such as graphite or composite materials, e.g. ceramics such as tin oxide, indium oxide and titanium oxide, doped with fluorine or antimony. Use is generally made of a reactive metal such as lithium.

This other active electrode material is also associated with a current collector, which can be produced in the same way and from the same materials as the current collector of the first active electrode material.

In the electrochemical generator according to the invention, the electrolyte is advantageously constituted by a non-aqueous solution or by a solid electrolyte such as an ethylene polyoxide. For example, the electrolyte can be constituted by a solution of at least one lithium salt, such as perchlorate, tetrafluoborate, tetrachloroaluminate, hexafluorophosphate or hexafluoroarsenate of lithium in an organic solvent.

The most varied organic solvents and their mixtures can be used. Examples of such solvents are linear ethers such as dimethoxyethane, cyclic ethers such as tetrahydrofuran and dioxolane, as well as esters such as propylene carbonate. Generally, the lithium salt concentration of the solvent is 1 to 3 mole/l.

In the electrochemical generator according to the invention, the semipermeable diaphragm separating the anode and cathode compartments serve to prevent the migration of oxidized or reduced species of the additive formed in the compartment to which this additive has been added, whilst remaining permeable to the ions of the electrolyte. Thus, when the electroactive compound is added to the cathode compartment, the diaphragm must be impermeable to the reduced species of the electroactive compound, whilst in the case where said compound is added to the anode compartment, the diaphragm must be impermeable to the oxidized species of the electroactive compound. When the electroactive compound is ferrocene, the semipermeable diaphragm can be made from Nafion.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
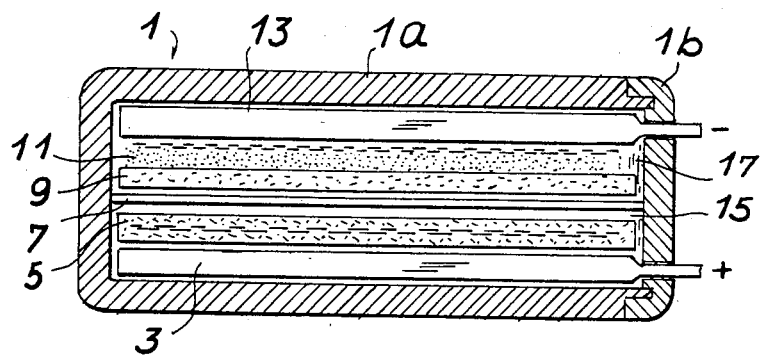
FIG. 1 a vertical section through an electrochemical generator according to the invention.

In FIG. 1, the generator comprises a tight box or case 1 formed from two parts 1a and 1b and made e.g. from polyethylene. Within said box are successively provided a first stainless steel current collector 3, a positive active material 5 constituted by a 10 micron thick polypyrrole film, a semipermeable diaphragm 7 made from Nafion, a mineral fibre separating material 9, an active negative material 11 constituted by lithium and a second stainless steel current collector 13. The Nafion diaphragm 7 defines within the said box an anode compartment 15 and a cathode compartment 17. Each of these compartments is filled with electrolyte, constituted by a solution of lithium perchlorate in propylene carbonate with a lithium perchlorate concentration of 2 mole/l, which also contains $10^{-2}$ mole/l of ferrocene in anode compartment 15 or positive electrode compartment only. This compartment is anodic during charging and cathodic during discharging.

It is pointed out that several elements of this type can be arranged in series to form an electrochemical accumulator.

In this embodiment, the active positive material 5 consituted by polypyrrole has been obtained by the electrolytic polymerization of pyrrole of formula:

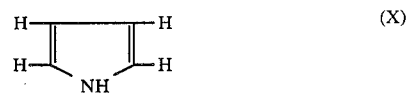

in a solvent constituted by propylene carbonate or acetonitrile containing approximately 1 mole/l of lithium perchlorate as the support electrolyte and by using as the electrode a stainless steel grid and a lithium or stainless steel counter-electrode. Under these conditions, by operating under a current density of 0.2 mA/cm², a 10 μm thick $ClO_4^-$-doped polypyrrole electrolytic deposit is obtained on the electrode constituted by the stainless steel grid. This grid is then welded to the stainless steel collector 3, which has a surface of 16 cm².

The negative active material 11 formed by lithium is deposited by electrolysis on a stainless steel grid, which is also welded to the second stainless steel current collector 13.

As is shown in the drawing, the first current collector 3 constitutes the positive pole of the generator and the second current collector 13 constitutes its negative pole. Connections passing out of box 1 make it possible to respectively connect current collectors 3 and 13 to an electrical generator or to a load circuit.

This generator has an electromotive force of 3.3 V with a current density of approximately 1 mA/cm². It can be completely discharged in 3 minutes whereas in the case of a generator not having ferrocene in compartment 15 this can only be brought about when the polypyrrole deposit does not exceed 2.5 microns, naturally with a much lower current density. Thus, due to the invention, it is possible to obtain the discharge under the same conditions, but whilst increasing the power of the battery by a factor of close to 4.

Figure 2:
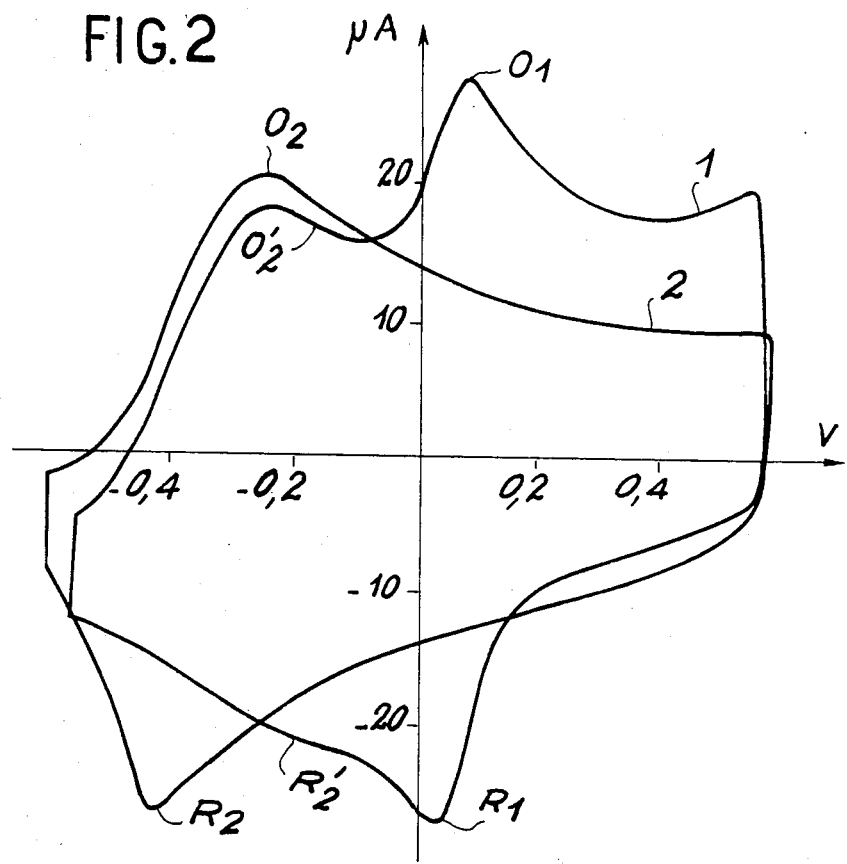
FIG. 2 a graph illustrating the cyclic voltametry curve obtained with the generator according to the invention incorporating polypyrrole and ferrocene (curve 1) and a generator only using polypyrrole (curve 2) as the active positive material.

FIG. 2 shows the cyclic voltametry curve obtained with a sweep velocity of 0.1 V/s obtained with the active material of a generator of the same type having (for curve 1) a $3 \times 10^{-2}$ μm thick polypyrrole layer, an electrolyte constituted by acetonitrile having a lithium perchlorate concentration of 0.1 mole/l and ferrocene with a concentration of $1.5 \times 10^{-3}$ mole/l$^{-1}$ in the anode compartment. Cathode 2 is obtained under the same conditions as curve 1, but without the addition of ferrocene to the anode compartment. These curves are recorded by means of a potentiostat. The potentials are controlled with respect to the reference electrode Ag-/Ag+$10^{-2}$M. The peaks $O_1$ and $R_1$ of curve 1 correspond to the redox couple of ferrocene in the polymer.

$O_1$ is the oxidation peak of ferrocene into ferricine, whilst $R_1$ is the reduction peak of ferricine into the polymer. Curve 2 shows the redox system of the polymer when ferrocene is absent. $O_2$ is the oxidation peak of the neutral polymer, its potential being an estimate of the redox potential of the polymer. $R_2$ is the reduction peak of the oxidized polymer. The potential difference between $O_2$ and $R_2$ is close to 200 mV. This difference illustrates the slowness of the electrochemical system of the polymer and leads to a limit to the power of the batteries. Thus, if the polymer system was NERNSTIEN and in accordance with thermodynamic laws, the potential difference of peaks $O_2$ and $R_2$ would be equal to zero.

In the presence of ferrocene, peaks $O_2$ and $R_2$ are replaced on curve 1 by $O_2'$ and the shoulder $R_2'$. The positions of $O_2'$ and $O_2$ are close to one another, whilst the value of the potential $R_2'$ is close to that of $O_2'$ and the potential difference between $O_2'$ and $R_2'$ is virtually zero. This explains how a fast battery discharge can be obtained, because the redox system of the polymer now has all the characteristics of a thermodynamic behaviour without any apparent kinetic limitation.

The following Examples 1 to 7 illustrate variant embodiments of the electrochemical generator disclosed hereinbefore.

In all the Examples the same generator structure is used as that shown in FIG. 1, with stainless steel current collectors 3 and 13, a semipermeable membrane 7 made of Nafion ®, a separating material 9 of mineral fibres and an electrolyte formed by a solution of lithium perchlorate in propylene carbonate in a 2 mole/l concentration of lithium perchlorate.

EXAMPLE 1

In this example the positive active material 5 is formed by a film of polypyrrole is formed by a film of polypyrrole 10 $\mu$m in thickness which was produced by electrolytic polymerization in the conditions set forth hereinbefore. The negative active material 11 is formed by a 5 $\mu$m layer of polypyrrole deposited on the stainless steel support 13 and coated with a second deposit of lithium obtained by electrolysis of lithium perchlorate in propylene carbonate.

In the compartment 15 of the positive electrode, $10^{-2}$ mole/l of ferrocene is added, and $2 \times 10^{-2}$ mole/l of benzophenone is added in the compartment 17 of the negative electrode.

This generator has an electromotive force of 3.4 volts with a current density of about 1.2 mA/cm$^2$.

EXAMPLE 2

In this example the positive active material 5 is formed by a 100 $\mu$m polyacetylene film prepared by the Shirakawa method, the negative active material 11 being formed by lithium. A $10^{-2}$ mole/l concentration of 1,1'-dicarbomethoxy-ferrocene is added to the electrolyte of the compartment 15.

This generator has an electromotive force of 3.9 volts, with a current density of 1.3 mA/cm$^2$.

EXAMPLE 3

In this example the positive active material 5 is formed by a 100 $\mu$m polyaniline film, the active material 11 of the negative electrode being formed by lithium. A concentration of $5 \times 10^{-3}$ mole/l of N-methylphenothiazine is added to the electrolyte of compartment 15 of the positive electrode.

This generator has an electromotive force of 3.8 volts, with a current density of 1.4 mA/cm$^2$.

EXAMPLE 4

In this example the current collector 13 is in graphite, not stainless steel, and the negative active material 11 is formed by a first deposit of 10 $\mu$m of polyaniline and a second deposit of lithium obtained by electrolysis. The positive active material 5 is in this case a 10 $\mu$m polypyrrole film. A concentration of $10^{-2}$ mole/l of ferrocene is added to the electrolyte of the compartment (15) and a concentration of $5.10^{-3}$ mole/l of 9,10-anthraquinone is added to the electrolyte of the compartment (17).

This generator has an electromotive force of 3.7 volts, with a current density of 1.1 mA/cm$^2$.

EXAMPLE 5

The negative active material 11 is formed by a 200 $\mu$m polyacetylene film prepared by the Shirikawa method and coated with lithium, the positive active material 5 being formed by a 10 $\mu$m polypyrrole film. A concentration of $10^{-2}$ mole/l of dinitromesitylene is added to the electrolyte of the component (15).

This generator has an electromotive force of 2.5 volts, with a current density of 1.15 mA/cm$^2$.

EXAMPLE 6

The positive active material 5 is formed by a sheet of polyphenylene prepared in the conventional chemical manner and fritted under a pressure of 4 tonnes, the thickness of the sheet being about 500 $\mu$m. The negative active material 11 is formed by lithium, and $10^{-2}$ mole/l of trinitro-triphenyl amine is added to the electrolyte of the component 15.

This generator has an electromotive force of 4 volts, with a current density of 1.2 mA/cm$^2$.

EXAMPLE 7

The positive active material 5 is formed by a 150 $\mu$m polythiophene film by electrolysis from acetonitrile containing $10^{-2}$ mole/l of bithiophene. The negative active material 11 is formed by lithium, and $10^{-2}$ mole 1 of thianthrene is added to the electrolyte of the compartment 15.

This generator has an electromotive force of 4.1 volts and a current density of 1.2 mA/cm$^2$.

What is claimed is:

1. An electrochemical generator comprising an anode compartment and a cathode compartment, separated by a semipermeable diaphragm and each containing an active elctrode material and an electrolyte, the active electrode material of at least one of the compartments being constituted by an electronically conductive organic polymer, wherein in one of these compartments in which the active electrode material is an organic polymer, the electrolyte of said compartment comprises an electroactive compound, which is soluble in the electrolyte and has a redox potential which is close to that of the organic polymer with which it is in contact, the variation between the redox potentials of the electroactive compound and the organic polymer being up to 500 mv.

2. An electrochemical generator according to claim 1, wherein the active electrode material of each of the said anode and cathode compartments is constituted by an organic polymer, wherein the electrolyte of the anode compartment comprises an electroactive compound, which is soluble in the electrolyte and has a redox potential equal to or higher than that of the organic polymer of the anode compartment, whilst the electrolyte of the cathode compartment comprises an electroactive compound differing from that of the anode compartment, which is soluble in the electrolyte and has a redox potential which is close to that of the organic polymer present in the cathode compartment.

3. An electrochemical generator according to claim 1 or claim 2, wherein the electroactive compound being in the anode compartment, said compound is chosen from the group including ferrocene and its derivatives, methoxylated derivatives of benzene, diphenyl-9,10-anthracene and its methoxylated derivatives, di-(naphthyl)-9,10-anthracene and its methoxylated derivatives, aromatic heterocyclic compounds and aromatic amines.

4. An electrochemical generator according to claim 3, wherein the electroactive compound is a ferrocene in accordance with formula:

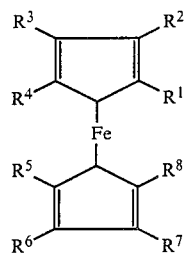
(I)

in which $R^1$, $R^2$, $R^3$, $R^4$, $R^5$, $R^6$, $R^7$ and $R^8$, which can be the same or different represents hydrogen, $NO_2$, $SO_2$, CN, $OCH_3$, Cl, F, SCN, OCN,

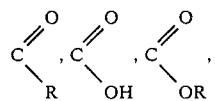

$So_2R$,

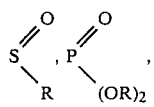

OR, SR and R, and R representing an alkyl or aryl radical.

5. An electrochemical generator according to claim 3, wherein the electroactive compound is a methoxylated derivative of benzene of formula:

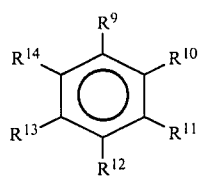
(II)

in which $R^9$, $R^{10}$, $R^{11}$, $R^{12}$, $R^{13}$, $R^{14}$, which can be the same or different, represent hydrogen, a methyl radical or a methoxy radical, provided that at least of the $R^9$, $R^{10}$, $R^{11}$, $R^{12}$, $R^{13}$, $R^{14}$ represent the methoxy radical.

6. An electrochemical generator according to claim 3, wherein the electroactive compound is an aromatic heterocyclic compound of formula:

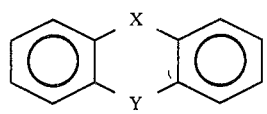
(III)

in which X and Y, which can be the same or different, represent NH, N-phenyl, N-alkyl, O or S.

7. An electrochemical generator according to claim 6, wherein the aromatic heterocyclic compound is phenothiazine.

8. An electrochemical generator according to claim 3, wherein the electroactive compound is a triphenylamine of formula:

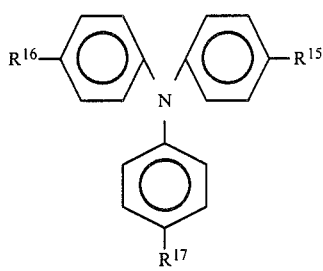
(IV)

in which $R^{15}$, $R^{16}$ and $R^{17}$, which can be the same or different, represent hydrogen Cl, Br, F, $NO_2$, $OCH_3$, $SO_2$, CN, SCN, OCN,

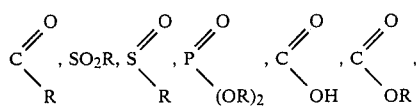

OR, SR and R with R representing an alkyl or aryl group.

9. An electrochemical generator according to claim 3, wherein the electroactive compound is a benzene of formula:

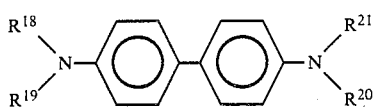
(V)

in which $R^{18}$, $R^{19}$, $R^{20}$ and $R^{21}$, which can be the same or different, represent hydrogen, alkyl group or a phenyl group.

10. An electrochemical generator according to claim 3, wherein the electroactive compound is a paraphenyldiamine of formula:

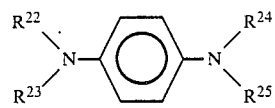
(VI)

in which $R^{22}$, $R^{23}$, $R^{24}$ and $R^{25}$, which can be the same or different, represent hydrogen, an alkyl group or a phenyl group.

11. An electrochemical generator according to claim 10, wherein the electroactive compound is tetraphenylparaphenyldiamine.

12. An electrochemical generator according to claim 3, wherein the electroactive compound is a hydrazine of formula:

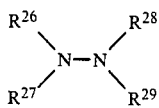 (VII)

in which $R^{26}$, $R^{27}$, $R^{28}$ and $R^{29}$, which can be the same or different, represent an alkyl group or a phenyl group.

13. An electrochemical generator according to claim 1 or claim 2, wherein the electroactive compound is in the cathode compartment, said compound being chosen from the group including polycyclic aromatic hydrocarbons, quinone derivatives and aromatic nitro derivatives.

14. An electrochemical generator according to claim 3, wherein the organic polymer is polypyrrole and the electroactive compound is ferrocene of formula (I) in which $R^1$, $R^2$, $R^3$, $R^4$, $R^5$, $R^6$, $R^7$, and $R^8$ represent hydrogen.

15. An electrochemical generator according to claim 1 or 2, wherein with the electrolyte constituted by a solution, the electroactive compound concentration of the electrolyte is $10^{-3}$ to 1 mole/l.

16. An electrochemical generator according to claim 1 or 2, wherein the electrolyte is a solution of at least one lithium salt in an organic solvent.

17. An electrochemical generator according to claim 6, wherein the lithium salt is lithium perchlorate.

* * * * *